(12) United States Patent
Scott

(10) Patent No.: US 10,591,108 B2
(45) Date of Patent: Mar. 17, 2020

(54) DEVICE FOR HOLDING AND SUPPORTING ARTICLES

(71) Applicant: 4th DIMENSION DEVELOPMENTS PTY LTD, South Victoria (AU)

(72) Inventor: Terry Walter Scott, South Victoria (AU)

(73) Assignee: 4TH DIMENSION DEVELOPMENTS PTY LTD, South Victoria (AU)

( * ) Notice: Subject to any disclaimer, the term of this patent is extended or adjusted under 35 U.S.C. 154(b) by 46 days.

(21) Appl. No.: 15/705,814

(22) Filed: Sep. 15, 2017

(65) Prior Publication Data

US 2018/0003338 A1  Jan. 4, 2018

Related U.S. Application Data

(63) Continuation of application No. PCT/AU2016/000085, filed on Mar. 15, 2016.

(30) Foreign Application Priority Data

Mar. 20, 2015 (AU) .............................. 2015901011

(51) Int. Cl.
*F16M 13/00* (2006.01)
*F16M 11/40* (2006.01)
(Continued)

(52) U.S. Cl.
CPC ............... *F16M 11/40* (2013.01); *A45F 5/00* (2013.01); *B25H 3/00* (2013.01); *F16B 2/10* (2013.01); *F16M 11/041* (2013.01); *F16M 11/14* (2013.01); *F16M 13/00* (2013.01); *F16M 13/022* (2013.01); *F21V 21/088* (2013.01); *F21V 21/32* (2013.01); *A45F 2200/0516* (2013.01); *A45F 2200/0575* (2013.01); *F16M 2200/022* (2013.01); *F16M 2200/068* (2013.01); *H04M 1/04* (2013.01)

(58) Field of Classification Search
CPC ...... F16M 13/02; F16M 13/00; F16M 11/041; F16M 11/40
USPC ............ 248/309.1, 316.1, 314, 316.2, 229.1, 248/229.14, 229.15, 229.2
See application file for complete search history.

(56) References Cited

U.S. PATENT DOCUMENTS 4,885,667 A    12/1989  Selden
5,101,333 A    3/1992   Glassford
(Continued)

OTHER PUBLICATIONS

Snakeclamp Products, "What is a SnakeClamp?", viewed on the Internet on Apr. 27, 2016 <URL:https://www.youtube.com/watch?v=5IttkTG8ake>, published on Jan. 22, 2015.
(Continued)

*Primary Examiner* — Steven M Marsh
(74) *Attorney, Agent, or Firm* — Myers Wolin, LLC

(57) ABSTRACT

An apparatus (10) for holding and supporting articles including support means (20) having receiving means (25, 26, 27), one or more elongate members (30, 32, 34) each having a first end adapted to fit into said receiving means (25, 26, 27) of the support means (20), connector means (40) adapted to fit to a second end of any one or more elongate members (30, 32, 34) for releasably engaging a respective article.

18 Claims, 15 Drawing Sheets

(51) Int. Cl.
*F16M 11/04* (2006.01)
*F16M 11/14* (2006.01)
*F16M 13/02* (2006.01)
*F16B 2/10* (2006.01)
*A45F 5/00* (2006.01)
*F21V 21/32* (2006.01)
*F21V 21/088* (2006.01)
*B25H 3/00* (2006.01)
*H04M 1/04* (2006.01)

(56) References Cited

U.S. PATENT DOCUMENTS

| | | | |
|---|---|---|---|
| 5,823,658 A | 10/1998 | Doddy | |
| 7,165,762 B1 | 1/2007 | Duzick | |
| 7,458,555 B2 | 12/2008 | Mastropaolo et al. | |
| 7,546,993 B1 * | 6/2009 | Walker | A61M 5/1415 |
| | | | 248/218.4 |
| 2004/0149875 A1 * | 8/2004 | Reynolds | A45D 20/12 |
| | | | 248/309.1 |
| 2004/0211868 A1 | 10/2004 | Holmes et al. | |
| 2005/0006542 A1 | 1/2005 | Henning et al. | |
| 2006/0077286 A1 | 4/2006 | Wenderski | |
| 2006/0278785 A1 * | 12/2006 | Wiesner | A61M 5/1415 |
| | | | 248/231.71 |
| 2009/0060473 A1 | 3/2009 | Kohte et al. | |
| 2010/0078536 A1 | 4/2010 | Galvin | |
| 2011/0073743 A1 | 3/2011 | Shamie | |
| 2013/0314866 A1 | 11/2013 | Millman | |

OTHER PUBLICATIONS

Mobile Fun, "Adustable Dual Windscreen Car Holder for Phones, Sat Navs, iPods and Much More", viewed on the internet on Apr. 27, 2016 <URL:https://www.youtube.com/watch?v=Roo7DYxub1Q>, published on Jan. 18, 2013.

Sparkfun, "SparkFun Third Hand Kit", pp. 1-7, retrieved from http://web.archive.org/web/20140701190328/https://www.sparkfun.com/products/11784 website on Apr. 27, 2016, published Jul. 1, 2014.

Rstraugh, "Third Hand++: A Multi-use Helping Hand for Electronics and Other Delicate Work", pp. 1-29, retrieved from http://www.instructables.com/id/Third-Hand-A-multi-use-helping-hand-for-electro> website on Apr. 27, 2016, published on Mar. 11, 2015.

International Search Report with Written Opinion issued for corresponding International Patent Application No. PCT/AU2016/000085 dated Apr. 29, 2016.

* cited by examiner

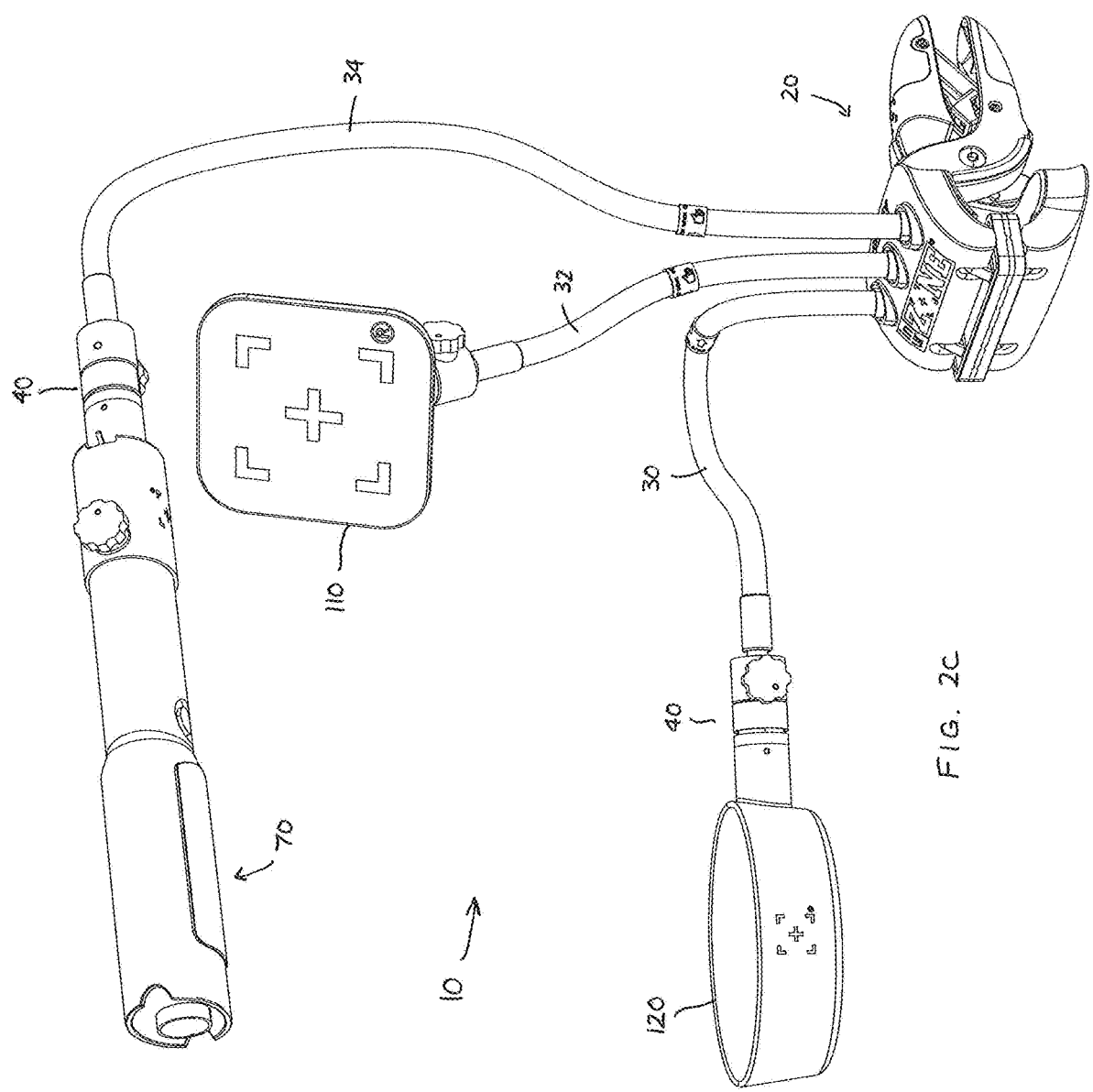

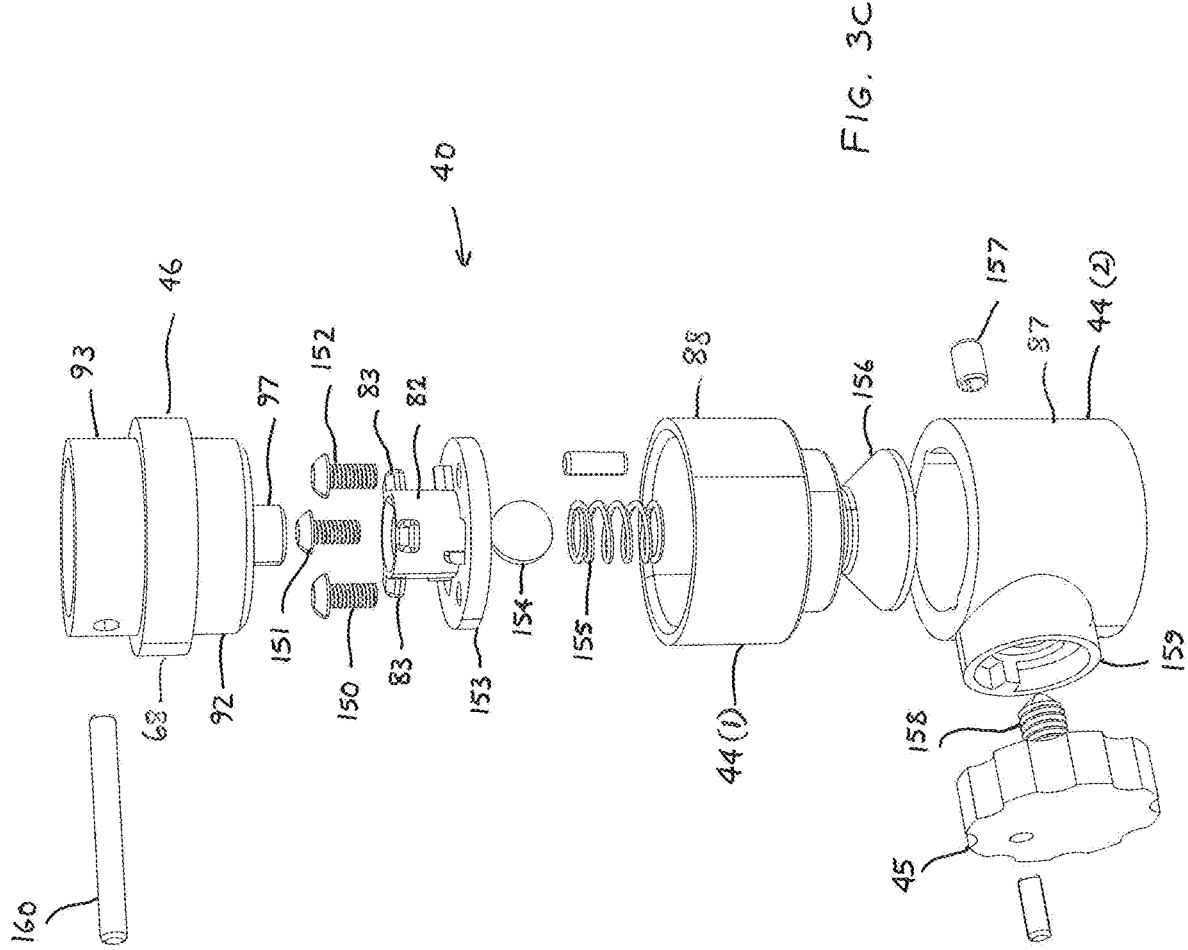

DEVICE FOR HOLDING AND SUPPORTING ARTICLES

CROSS REFERENCE TO RELATED APPLICATIONS

This is a continuation application under 35 USC 120 of International Application PCT/AU2016/000085, filed Mar. 15, 2016, which claims priority to AU Application 2015901011, filed Mar. 20, 2015, the contents of each of which are incorporated by reference herein.

FIELD OF THE INVENTION

This invention relates to a device, particularly a portable apparatus, which is able to support and hold a variety of articles, such as tools for a tradesperson, through connecting arms which are affixed to a support device.

BACKGROUND OF THE INVENTION

When a person is working to perform a particular task that uses many different items or tools, boxes and particularly tool boxes have been used to adequately store such items. Typically during the performing of the work at hand, the tools or articles that are being used are not returned to the toolbox but instead are usually left lying around within the vicinity of the working area. As a result the user, requiring a particular tool, may not be able to locate it quickly enough, which leads to inefficient use of time in performing the task, leading to frustration on the part of the user.

A user may also require use of other tools whilst having a tool in either hand which would entail the user having to release one tool and grab another tool and then just use two tools at once. Typical examples may be holding a light to light the subject being worked on or to use a mobile phone, for example, hands free. It would be exceedingly difficult to hold a portable light, speak on the phone and then use one or two other tools in order to work on the task at hand.

The present invention seeks to overcome the abovementioned disadvantages by providing a portable tool that can hold and support various articles in any position to assist a user to efficiently use a set of tools and complete the assigned job whilst keeping the tools or items within reach and easily seen.

SUMMARY OF THE INVENTION

According to a first aspect of the invention, there is provided an apparatus for holding and supporting articles including:

support means having receiving means;

one or more elongate members each having a first end adapted to fit into said receiving means of the support means;

connector means adapted to fit to a second end of any one or more elongate members for releasably engaging a respective article.

The support means can be placed on or attached to a surface and the apparatus may be accessible by a user working on a task. The support means is preferably a clamp having a pair of jaws and is able to be clamped to a surface whereby the surface is gripped between the jaws of said pair of jaws. The one or more elongate members are preferably flexible arms that can position a respective article in a desired location. The receiving means can be one or more sockets into which said end of the respective one or more elongate members is fitted. Preferably, the receiving means is located in or on one of the jaws or an associated structure of one of the jaws of the clamp.

The connector means may be formed by engagement between a first portion and a second portion, wherein said first portion has a first protrusion means at one end and said second portion has a second protrusion means at one end, wherein said first and second protrusion means are able to releasably engage with one another to provide a secure connection between the first portion and the second portion.

The first portion and second portion preferably have at each end thereof any combination of the first protrusion means and the second protrusion means. The first protrusion means preferably includes a series of first protrusions that are formed around a stem extending through a recess, said stem having a bore and said first protrusions in said first protrusion means defining a space between adjacent first protrusions. The second protrusion means may include a series of second protrusions that are formed in an interior wall of an opening, each said second protrusion being spaced apart from a pillar extending through the opening. The pillar is preferably adapted to fit into said bore of said stem and said series of second protrusions initially fits within the respective spaces between the first protrusions, such that the first portion and the second portion are rotated with respect to each other until the series of second protrusions are engaged against the series of first protrusions so as to secure the first portion to the second portion. The apparatus is preferably portable.

According to a second aspect of the invention, there is provided a connector arrangement for use in an apparatus, said apparatus having support means including receiving means and one or more elongate members each having a first end adapted to fit into said receiving means of the support means, the connector arrangement including:

a first portion and a second portion;

said first portion having first protrusion means at one end thereof and said second portion having second protrusion means at one end thereof;

wherein said first and second protrusion means are able to releasably engage with one another to provide a secure connection between the first portion and the second portion.

The first portion and said second portion may have at each end thereof any combination of the first protrusion means and the second protrusion means. Preferably the first protrusion means includes a series of first protrusions that are formed around a stem extending through a recess, said stem having a bore and said first protrusions in said first protrusion means defining a space between adjacent first protrusions. The second protrusion means may include a series of second protrusions that are formed in an interior wall of an opening, each second protrusion being spaced apart from a pillar extending through the opening. The pillar can be adapted to fit into said bore of said stem and said series of second protrusions initially fits within the respective spaces between the first protrusions, such that the first portion and the second portion are rotated with respect to each other until the series of second protrusions are engaged against the series of first protrusions so as to secure the first portion to the second portion.

BRIEF DESCRIPTION OF THE DRAWINGS

Preferred embodiments of the invention will hereinafter be described, by way of example only, with reference to the drawings in which:

FIG. 2C is a perspective view of the portable apparatus of FIG. 1 having different articles connected thereto;

FIG. 3C is an exploded perspective view of a connector means used in the apparatus of FIG. 1;

DETAILED DESCRIPTION OF THE PREFERRED EMBODIMENTS

Figure 1:
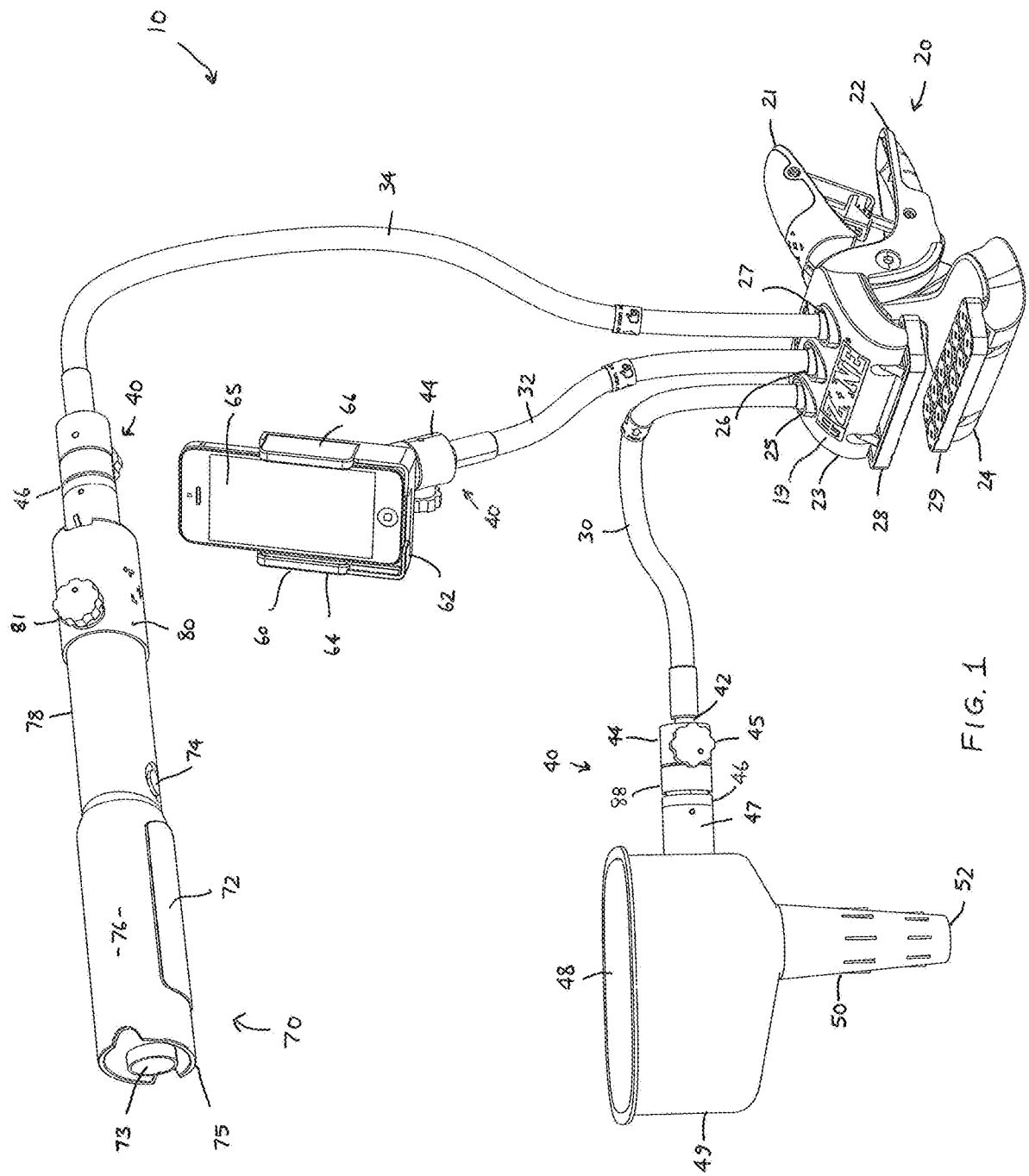
FIG. 1 is a perspective view of portable apparatus according to a first embodiment of the invention for supporting and holding articles including a funnel, mobile phone holder and light device.
Figure 2:
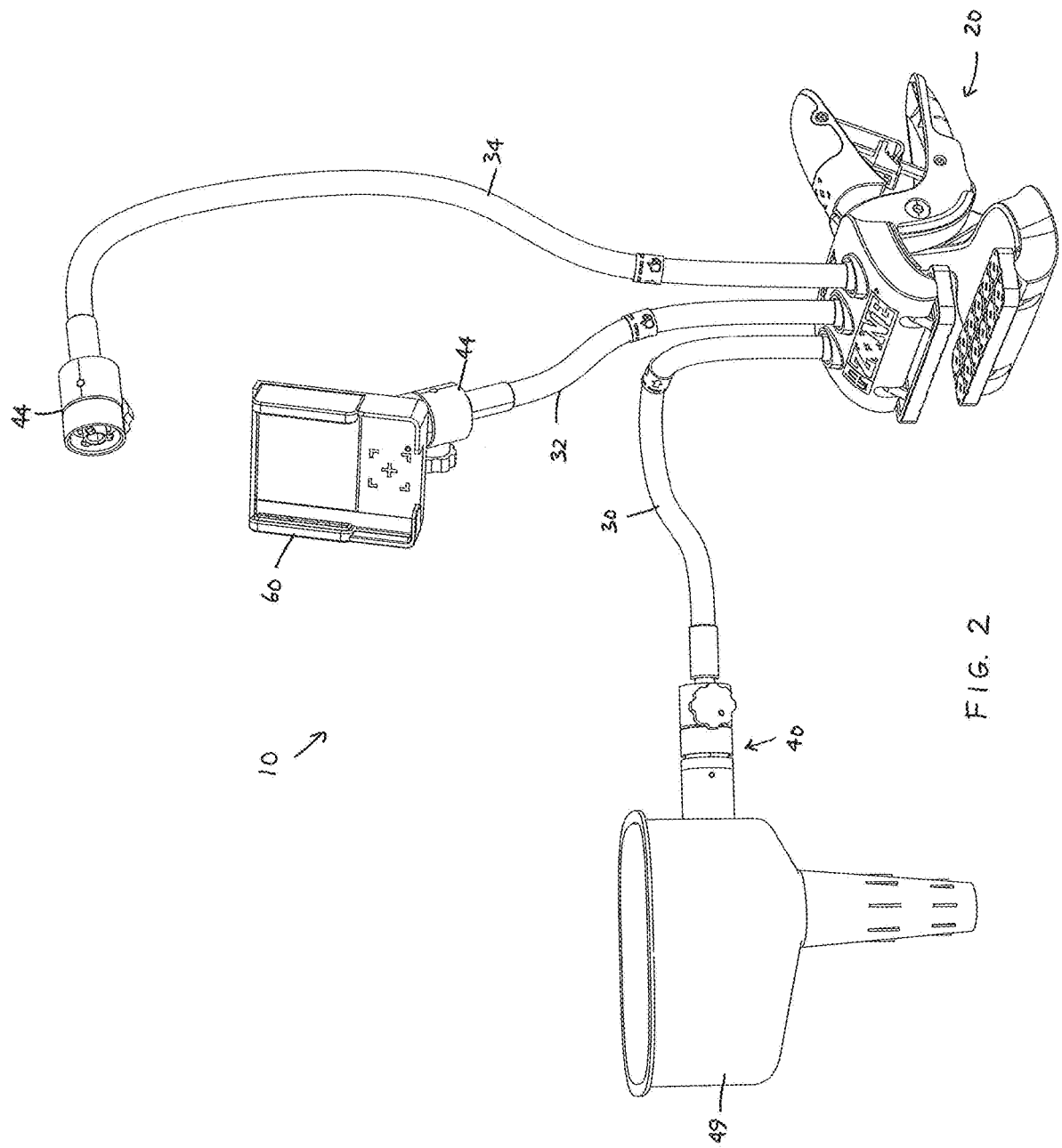
FIG. 2 is a perspective view of the portable apparatus of FIG. 1 without the light device and not showing a mobile phone in the mobile phone holder.

Referring to FIGS. 1 and 2 there is shown an apparatus 10, that is preferably portable, for supporting a plurality or articles or attachments, such as tools, lights, mobile phones. It includes a support means in the form of a clamping means 20 which has a pair of handles 21 and 22 that are squeezed towards each other in order to clamp against a surface between first and second jaws 23 and 24. A pair of pads 28 and 29 exist on respective inner surfaces of jaws 23 and 24 to protect the surface against which the clamp device 20 grips. As an alternative to using a clamping means 20, any sturdy support device that can be placed on a surface or on the ground may be used instead. Extending from an outer face 19 (or structure) of jaw 23 are a series of apertures 25, 26 and 27, for respectively receiving elongate members in the form of flexible arms 30, 32 and 34 that can be solid shafts or stems. Each of the arms 30, 32 and 34 may be any desired length or may each include a number of segments that attach together to form each respective arm. Any number of arms may be used to fit into a corresponding number of apertures on the jaw 23.

Figure 5B:
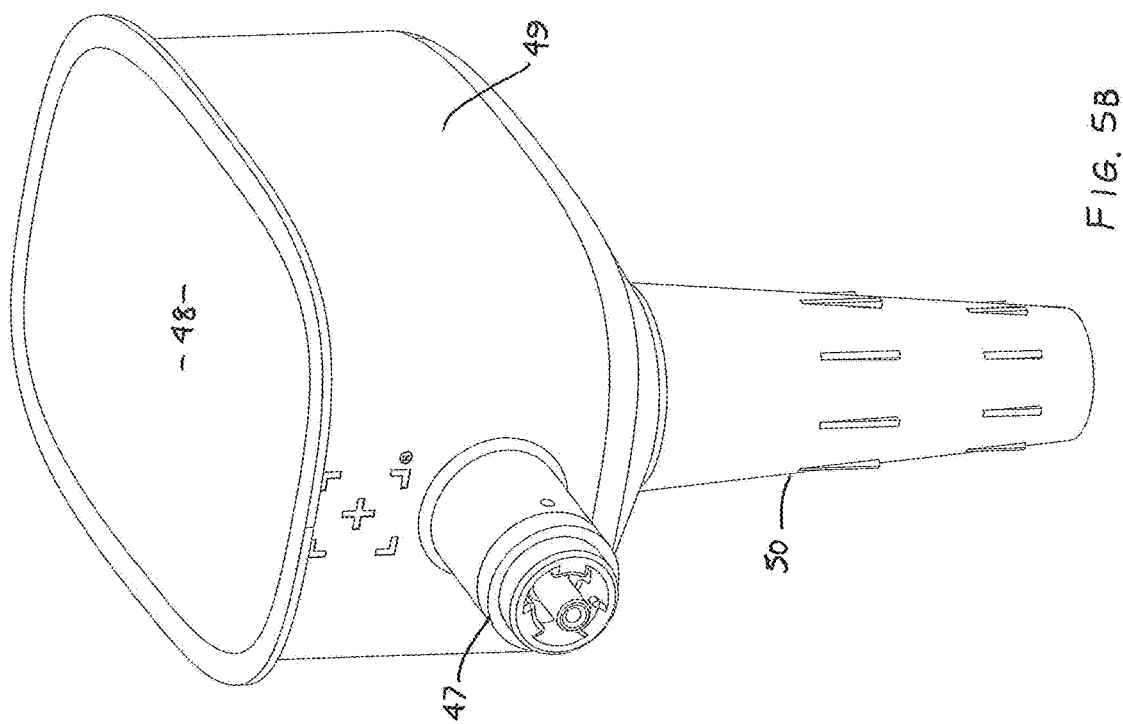
FIGS. 5A and 5B are perspective views of an attachment or article in the form of a funnel.
Figure 5A:
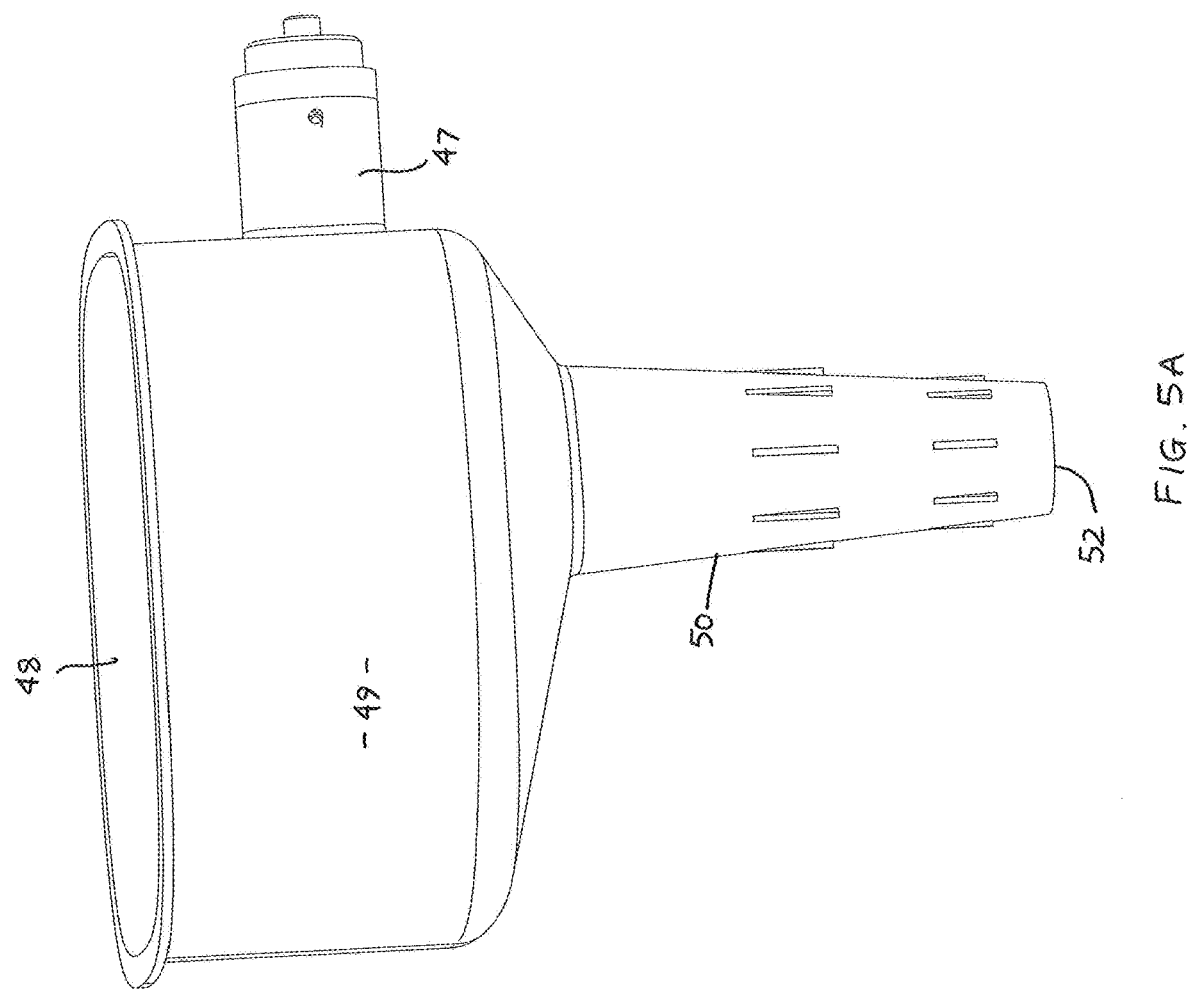

Located at an outer or distal end of each of the arms 30 to 34 is a connector means 40 for connecting each arm 30, 32, 34 to various implements, such as a funnel 49 having opening 48 (see FIGS. 5A and 5B for more detail), mobile phone holder 60, lamp 70 or other devices such as a container for holding articles like nuts and bolts, or a magnetic pad to which any device or tool can be securely held temporarily.

Figure 2A:
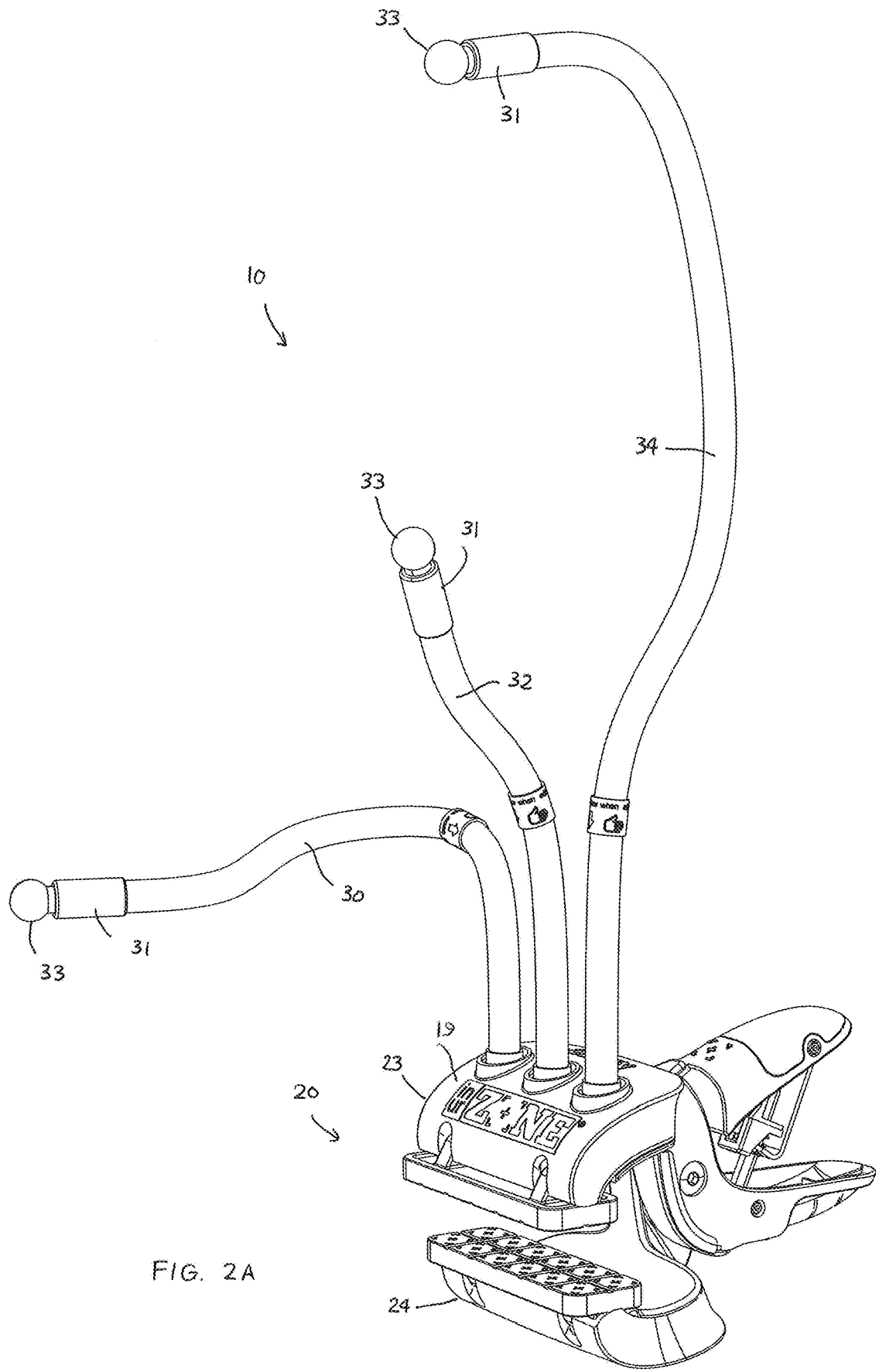
FIG. 2A is a perspective view of the portable apparatus of FIG. 1 with ball attachments at distal ends of arms of the apparatus.
Figure 2B:
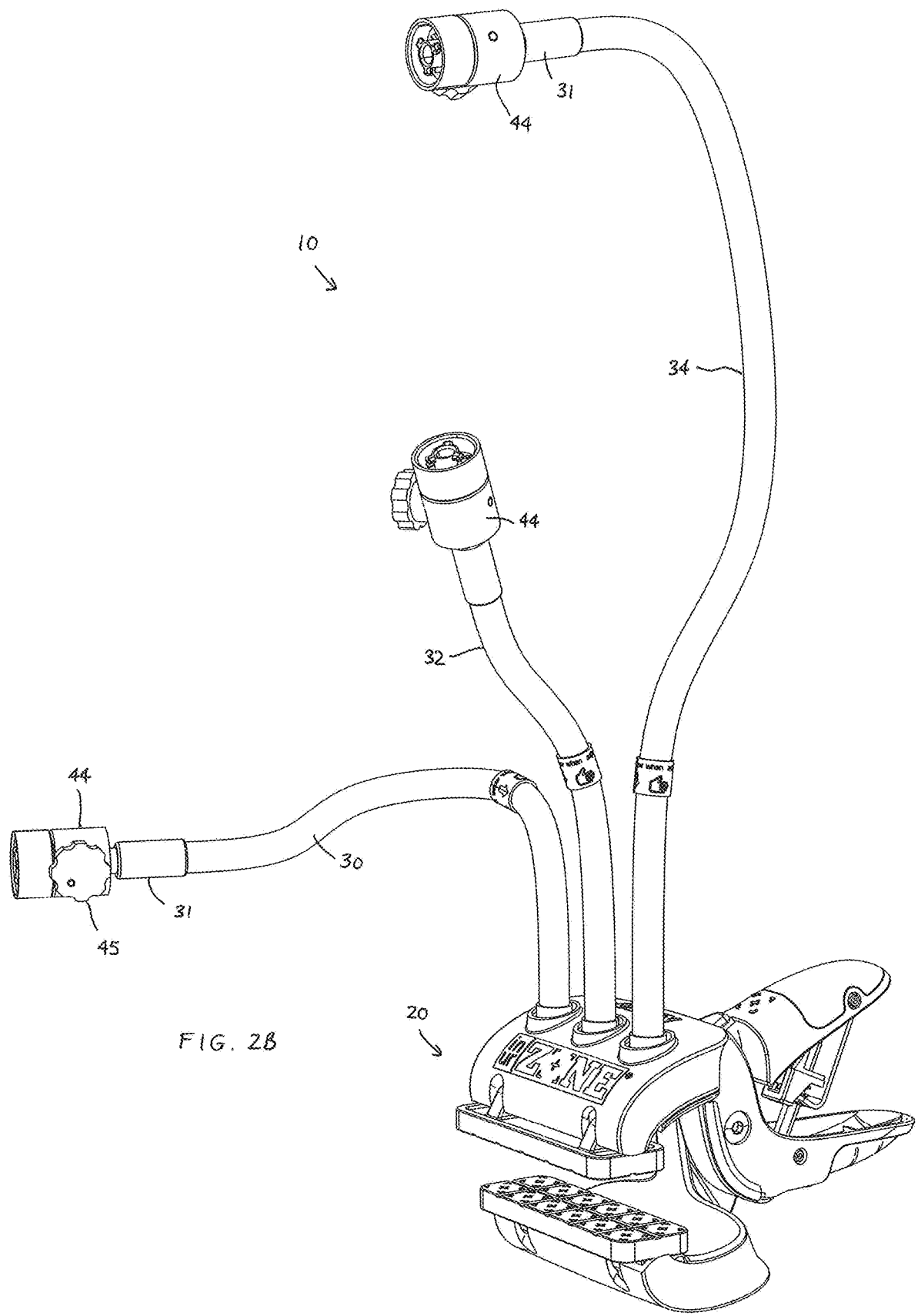
FIG. 2B is a perspective view of the portable apparatus of FIG. 1 showing connector means attached to the ball attachments of FIG. 2A.

FIG. 2A shows each of the arms 30, 32 and 34 having at a distal end a connector 31 fitted with a ball 33. The ball 33 can be inserted into one end 87 (see FIG. 3B) of a first portion 44 of connector 40 (described below). FIG. 2B shows the first portion 44 fitted to respective balls 33 at the distal end of arms 30, 32 and 34, ready to receive second portion 46. FIG. 2C shows the apparatus 10 of FIG. 1 with the container 120 connected to arm 30 instead of funnel 49, and magnetic support pad 110 connected to arm 32 instead of mobile phone holder 60. Clamp 20 is shown in a closed or gripping configuration.

Figure 2D:
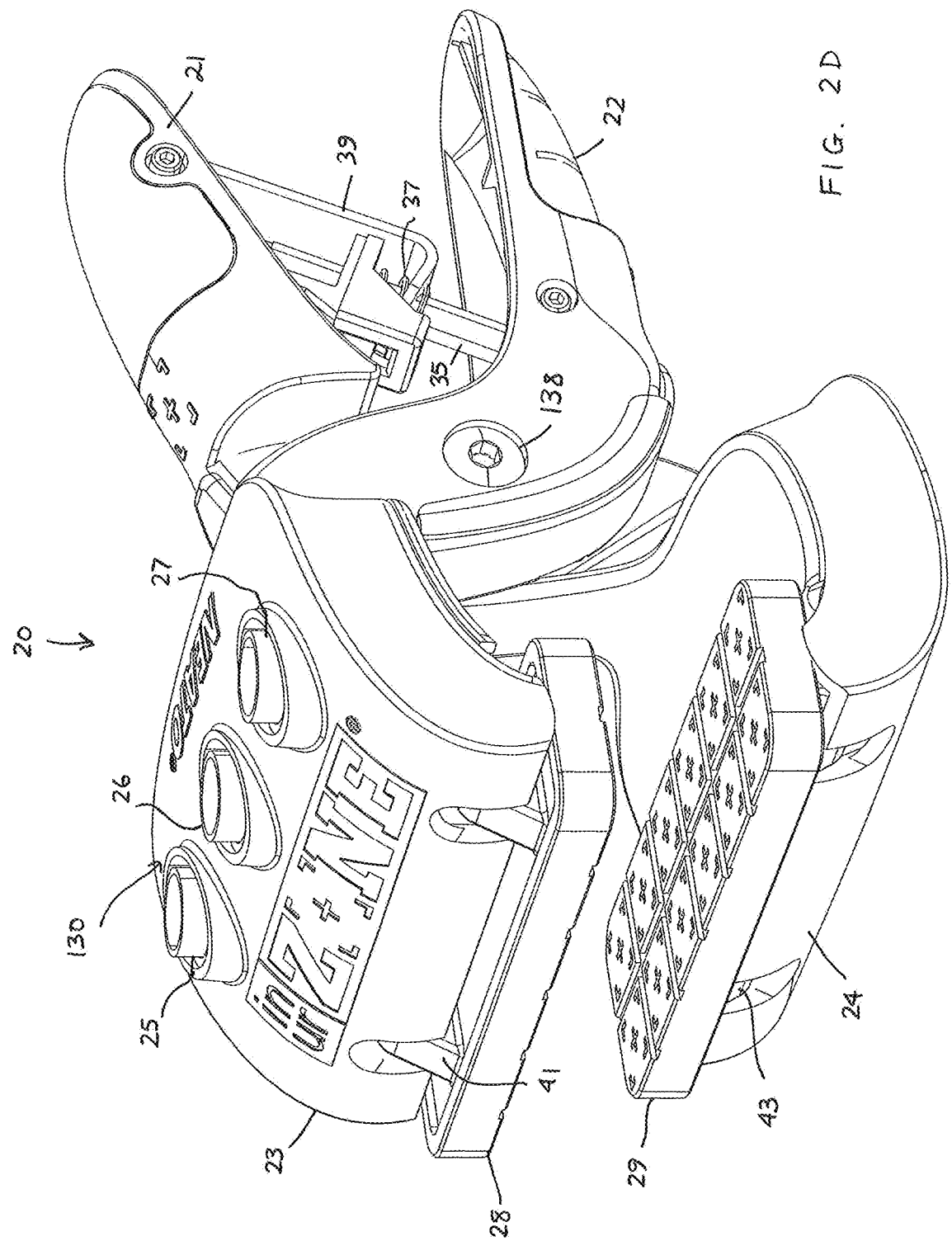
FIG. 2D is an enlarged perspective view of support means, in the form of a clamp, of the apparatus of FIG. 1.

Support means or clamp 20 is shown in more detail in FIG. 2D. Between handles 21 and 22 is located a bracket 39 through which spring 37 and shaft 35 protrude allowing the handles 21, 22 to be brought together against the tension in the spring 37. Pads 28, 29 can be exchanged with other pads by removal from jaw members 41, 43.

Figure 2E:
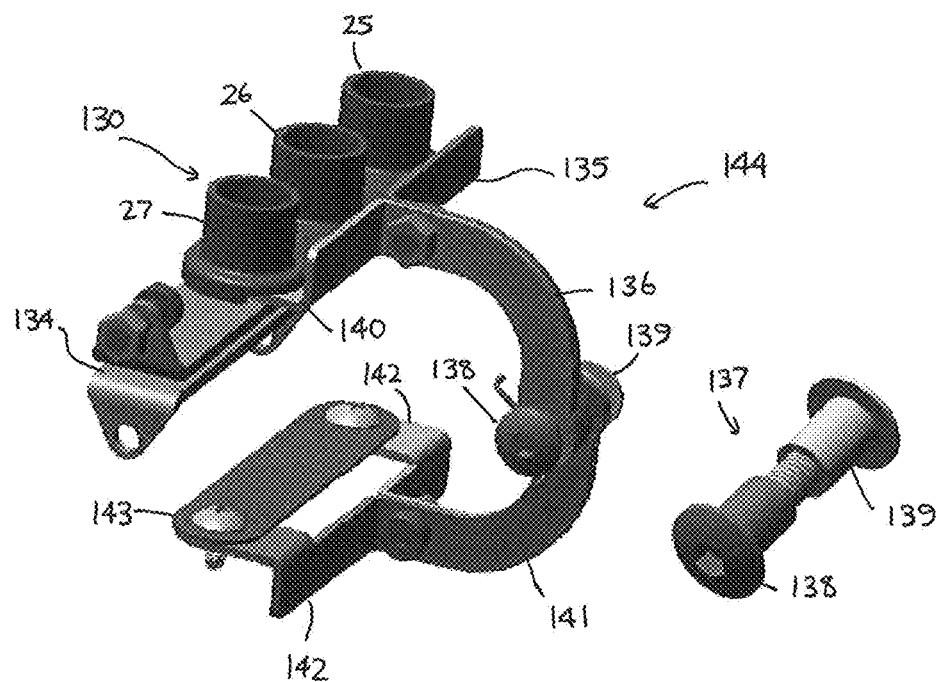
FIG. 2E is a perspective view of a portion of the clamp showing receiving means for receiving proximal ends of elongate members of the apparatus.
Figure 2F:
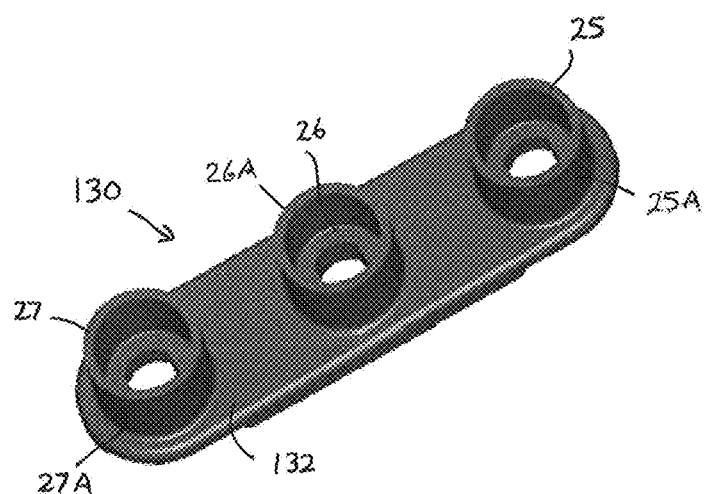
FIG. 2F is a perspective view from above of the receiving means.

Referring to FIGS. 2E and 2F there is shown a portion of the clamp 20. Receiving means 130 has a series of bosses 25A, 26A and 27A that form apertures 25, 26 and 27 respectively for receiving proximal ends of arms 30, 32 and 34. The bosses 25A, 26A and 27A are formed on a supporting bracket 132. Bracket 132 is connected to seat 140 of bracket 135 of caliper 144. The caliper 144 has a pair of legs 136 and 141 joined by connections means 137 in the form of bolt 138 and nut 139. At each free end of legs 136 and 141 there is connected respectively bracket 135 and bracket 134 (which is formed in first jaw 23) and bracket 142 with plate 143 (formed in second jaw 24).

Figure 3A:
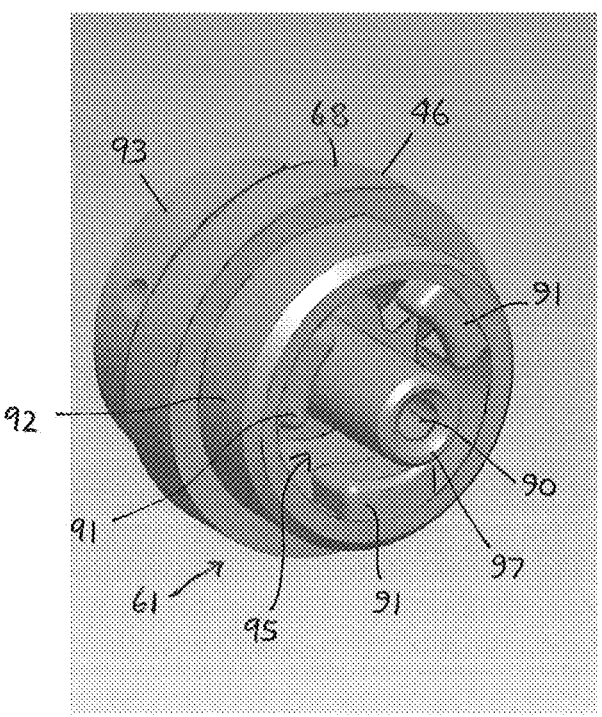
FIG. 3A is a perspective view of a first portion of a connector means for connecting articles to respective elongate members or arms of the apparatus of FIG. 1.
Figure 3B:
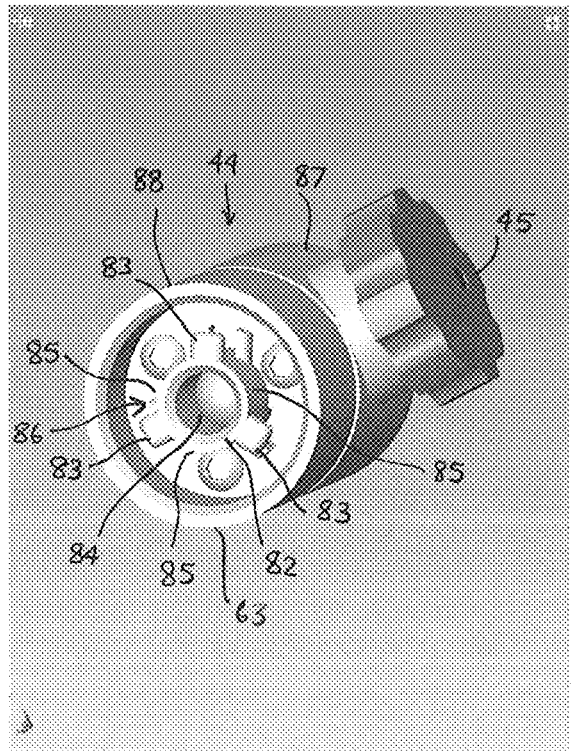
FIG. 3B is a perspective view of a second portion of a connector means for connecting articles to respective elongate members or arms of the apparatus of FIG. 1.

The connector 40 has a series of components that fit with one another and this is more clearly shown in FIGS. 3A and 3B. As an example, funnel 49, with opening 48, spout 50, shaft 47 and spout opening 52, is connected to arm 30 through connector 40 which has the first portion 44 having an open end 87 (not shown in FIG. 3B) which is able to have connected thereto portion 42, which may for example be a ball joint (such as ball 33) to enable rotation of the article in any direction. The first portion 44 is simply placed on the ball in a snap-fit configuration. At the near end 88 of connector 44 shown in FIG. 3B there is a recess 86 formed in end 88. Within the recess 86 is a first engagement part which includes a stem 82 which has an interior bore 84 and first protrusion means in the form of a series of first protrusions 83 spaced around the periphery of the stem 82. Between each of the protrusions 83 are spaces 85 to receive second protrusion means in the form of a series of second protrusions 91 of second portion 46 of the connector 40 shown in FIG. 3A. The second portion 46 has at a distal end a boss 92 which also has an opening 95 with pillar 97 having an opening 90. The second set of protrusions 91 are formed around an inner edge of the opening 95 and this end 61 is designed to fit into the open, near end 88 shown in FIG. 3B. Thus, the pillar 97 fits within bore 84 of recess 86, with each of the second protrusions 91 positioned in the spaces 85 between adjacent first protrusions 83. This then enables the boss 92 to fit within the recess 86 and for mid-portion 68 of second portion 46 to fit flush against or near to an annular surface 63 of end 88. The second portion 46 can then be rotated with respect to first portion 44 so that the protrusions 91 reside behind and in contact with the protrusions 83 in the space provided in recess 86. Thus a secure engagement is provide between the portions 44 and 46. At the other end of portion 46, which is internal to the boss 93, is a space that can be open to receive any one of a number of articles or other connectors. For example it can be open to fit a ball joint so that it provides universal movement of any article attached thereto, it can have the connector arrangement shown in FIG. 3A, being the male component, or the connector arrangement shown in FIG. 3B, being the female component. It provides a quick release connector system. Thus the first and second portions 44 and 46 can be used in a variety of applications in order to connect the articles to the flexible arms 30 to 34. Handle 45 has knurls thereon to assist in tightening and untightening a connector such as a ball joint into the open socket located at the other end 87 of the first portion 44.

FIG. 3C shows an exploded view of connector 40. It includes first and second portions 44 and 46, with portion 44 conveniently shown split into two parts 44(1) and 44(2). Part 44(1) receives support mount 153 that has stem 82 extending therefrom. At the bottom of the support mount 153 is a ball-bearing 154 that acts on spring 155 when second portion 46 is engaged with or disengaged from part 44(1) of first portion 44. The support mount 153 is affixed to part 44(1) through screws 150, 151 and 152 into a mounting (not shown). When connecting male second portion 46 to female first portion 44, more particularly part 44(1), pillar 97 is positioned in bore 84 of stem 82. Pressure is then applied against support mount 153 through boss 92 so that support mount 153 moves slightly with respect to the stem 82 and protrusions 83 until the protrusions 91 in portion 46 are moved out of spaces 85 and are positioned behind protrusions 83. The portion 46 is then rotated until the protrusions 91 are abutting against the rear sides of protrusions 83 to form a firm connection between portions 44 and 46. The reverse procedure applies when releasing or disengaging the portion 46 from portion 44. Pin or rod 160 is used to hold an article or attachment to the portion 46. The bottom of spring 155 sits against the top of cone 156, which is open-ended at its lower end. The cone 156 resides in part 44(2) and the open lower end thereof receives ball 33 to connect the connector 40 to an arm 30, 32 or 34. Pin 157 and threaded portion 158 of handle 45 can be set to touch and hold the ball 33 in place. Threaded portion 158 engages an internal thread in boss 159 to which handle 45 is fitted.

Figure 3D:
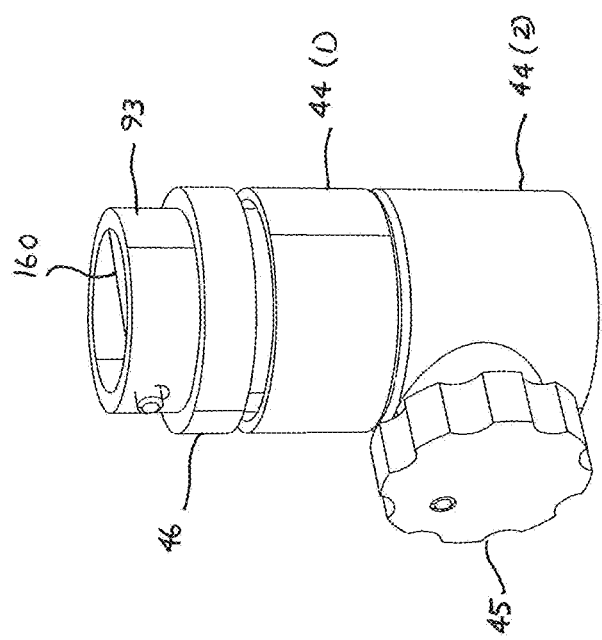
FIG. 3D is a perspective of the connector means of FIG. 3C fitted in use.

FIG. 3D shows connector 40 with first and second portions 44 and 46 connected to one another.

Figure 4A:
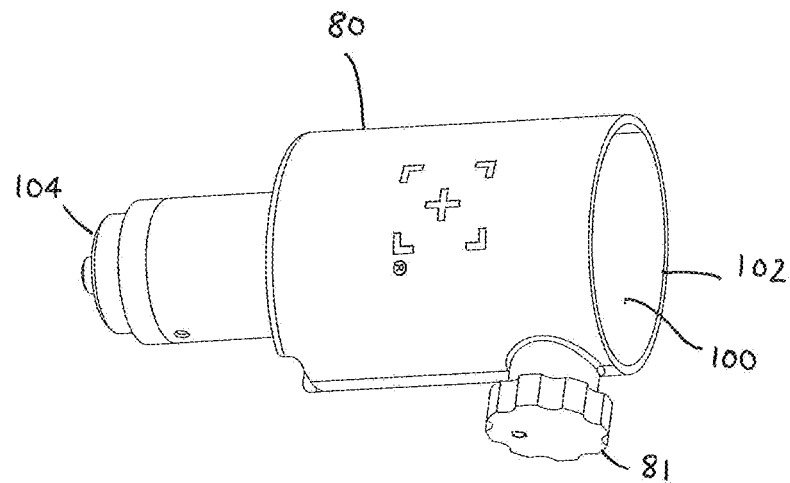
FIGS. 4A and 4B are perspective views of an alternative portion of a connector means.
Figure 4B:
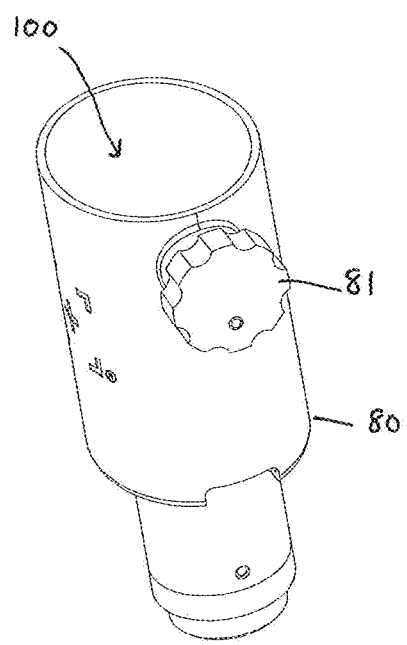

Connector 80, that affixes the light device 70 to the connection means 40 as seen in FIG. 1, is shown in more detail in FIGS. 4A and 4B. The connector 80 has an aperture 100 at one end 102 which is sized to fit a large diameter shaft such as shaft 78 which forms part of the light device 70. Handle 81 can be adjusted to tighten against the shaft 78 in order to hold the shaft 78 in place. The other end 104 of the connector 80 can fit into either end of the portions 46 and 44, with the reverse arrangement of protrusions 83, 91 that fit together. The light fitting 70 has a transparent or semi-transparent window 72 through which light protrudes, a push button 74 for activation of the light and a main tube or shaft 76 for fitting of the electrical components of the lighting device 70. A further on-off switch 73 is located at outer end 75 of the light device 70.

The mobile phone attachment 60 is attached to a portion 44 and has a bottom end 62 and sides 64 and 66 in which a mobile phone 65 can be secured. In use the phone typically provides instructions or a drawing/picture which the user may want to follow while having hands free to work on other aspects of the task. The attachment device 60 may have an attachment similar to the portion 46 shown in FIG. 3A which can fit into a corresponding portion 44 shown in FIG. 3B. Alternatively it may be provided with a ball joint for universal angulation so that it can be positioned at a suitable angle for the user.

Figure 6B:
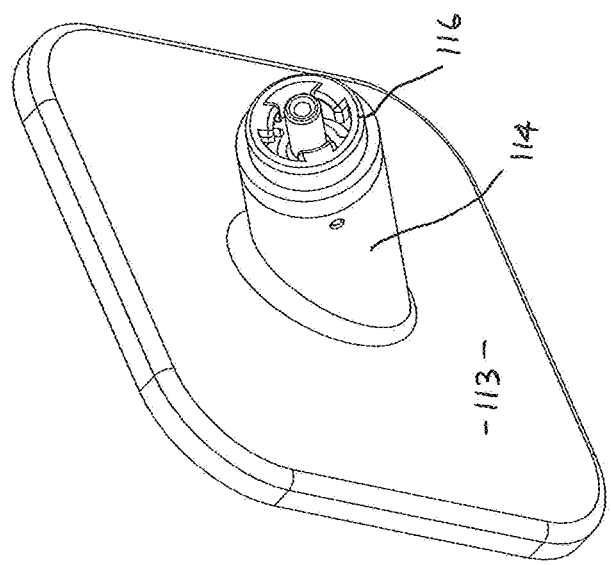
FIGS. 6A and 6B are front and rear perspective views of an attachment or article in the form of magnetic pad.
Figure 6A:
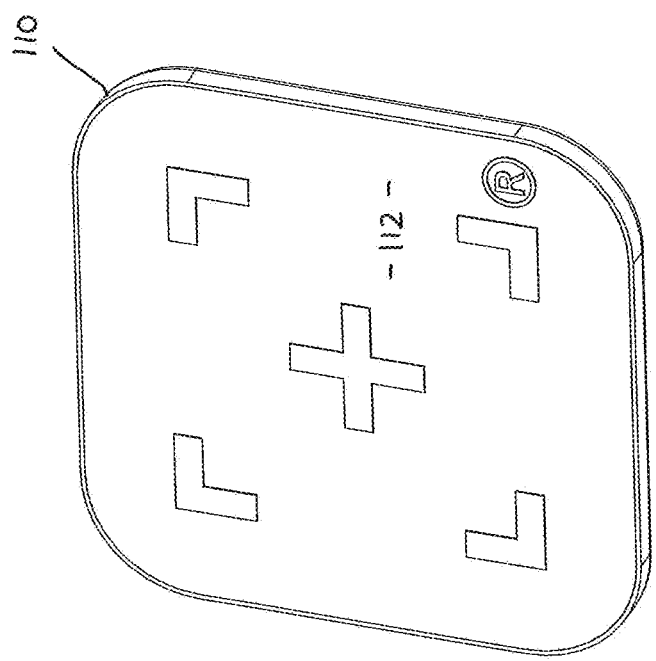

FIGS. 6A and 6B show front and back perspective views of a magnetic support pad 110, against which metal tools or implements can be temporarily secured conveniently within reach of a user, so that tools such as spanners are not misplaced, but are easily visible and accessible. The support pad 110 has front face 112 with magnetic material formed therein while the back portion 113 has a shaft 114 protruding therefrom and a connector 116 which can be either of the types shown in FIGS. 3A and 3B for connection to arm 32.

Figure 7B:
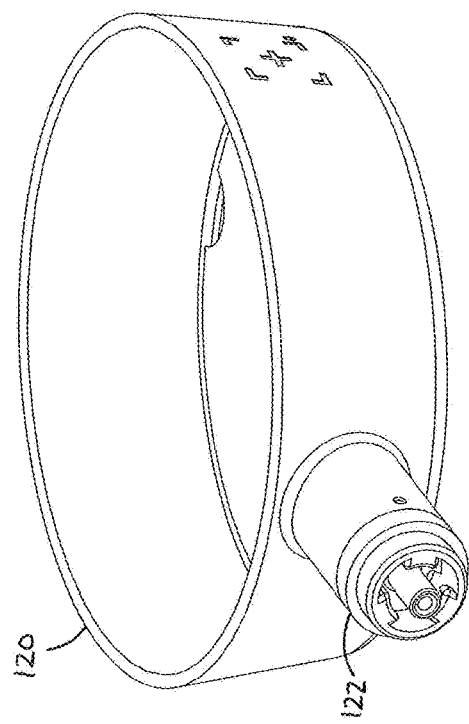
FIGS. 7A and 7B are perspective views of an attachment or article in the form of a container or tray for storing small items.
Figure 7A:
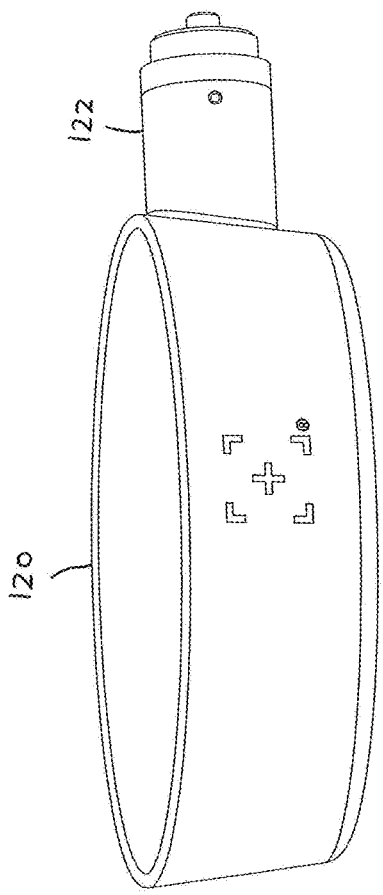

FIGS. 7A and 7B show perspective views from the side of a container 120 which can be used to house small items such as nuts, bolts and screws. It has a connector or shaft 122 for attachment to one of the arms 30, 32 or 34 for example and may have the connection arrangement such as that shown in FIG. 3A or 3B. Located within container 120, preferably on the bottom of the container 120, are removable magnetic strips that can hold the small items (mentioned above) in place. This is particularly advantageous when the items need cleaning, such as greasy nuts or bolts by rinsing the items through a solvent and then drying them using an air gun, whereby the items are held in place due to the magnetic strips. Any other means of holding the items in place can be used and can extend across the whole surface of the bottom or sides of the container 120.

Figure 8B:
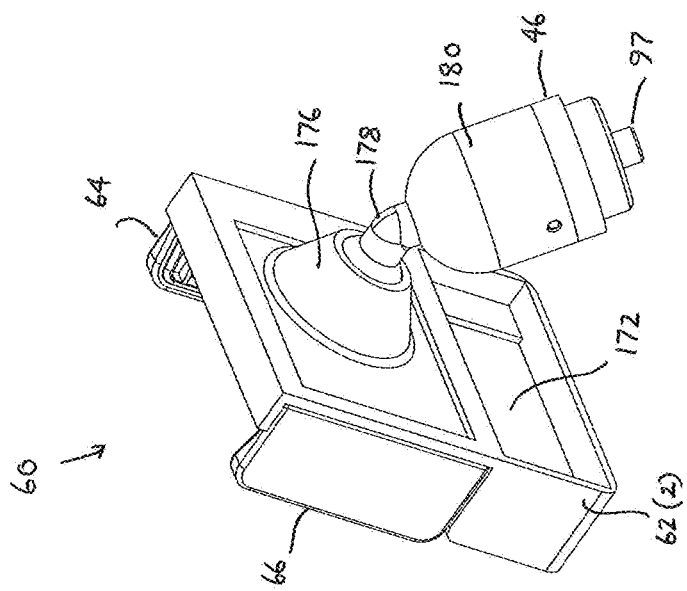
FIGS. 8A and 8B are front and rear perspective views of a mobile phone holder attachable to the apparatus of FIG. 1.
Figure 8A:
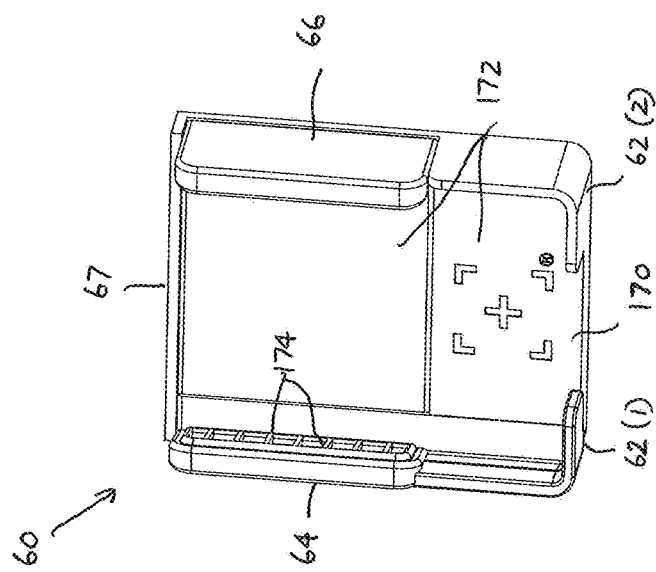

Referring to FIG. 8A there is shown mobile phone holder 60. It has side portions 64, 66 which have ribs 174 on an inner side for gripping a mobile phone 65. Bottom end 62 is formed in two curved portions 62(1) and 62(2), while base portion 170 or 172 is bounded by sides 64, 66, bottom end 62 and a top portion 67. FIG. 8B shows a rear view of the holder 60 having cone member 176 having a ball joint attached to neck 178 (that can be flexible to position the holder in a desired position). Neck 178 is attached to connector 180 to which is attached male portion 46.

The apparatus hereinbefore described provides an effective method of attaching and positioning many attachments or articles for use by a user when working on a particular task, while enabling the user free use of his or her hands and having the attachments or articles within sight and within easy reach, without losing or misplacing the attachments or articles.

I claim:
1. An apparatus for simultaneously holding and supporting articles including:
   support means having receiving means, wherein the support means is placed on or securely attached to a surface and the apparatus is accessible by a user working on a task;
   a plurality of continuous elongate members each having a first end adapted to insert and fit into said receiving means of the support means, wherein each continuous elongate member is a flexible arm that can position a respective article at a desired location independent of any other continuous elongate member; and
   a plurality of distinct interchangeable connector means adapted to fit to a second end of each of the continuous elongate members for releasably engaging a respective article.

2. Apparatus according to claim 1, wherein the support means is a clamp having a pair of jaws and is able to be clamped to a surface whereby the surface is gripped between the jaws of said pair of jaws.

3. Apparatus according to claim 2, wherein the receiving means is a plurality of sockets into which said end of the respective continuous elongate member fitted.

4. Apparatus according to claim 3, wherein the receiving means is located in one of the jaws of the clamp.

5. Apparatus according to claim 1, wherein the connector means is formed by engagement between a first portion and a second portion, wherein said first portion has a first protrusion means at one end and said second portion has a second protrusioa means at one end, wherein said first and second protrusion means are able to releasably engage with one another to provide a secure connection between the first portion and the second portion.

6. Apparatus according to claim 5, wherein the first portion and second portion has at each end thereof any combination of the first protrusion means and the second protrusioa means.

7. Apparatus according to claim 5, wherein said first protrusion means includes a series of first protrusions that are formed around a stem extending through a recess, said stem having a bore and said first protrusions in said first protrusioa means defining a space between adjacent first protrusions.

8. Apparatus according to claim 7, wherein said second protrusioa means includes a series of second protrusions that are formed in an interior wall of an opening, each said second protrusioa being spaced apart from a pillar extending through the opening.

9. Apparatus according to claim 8, wherein said pillar is adapted to fit into said bore of said stem and said series of second protrusions initially fits within the respective spaces between the first protrusions, such that the first portion and the second portion are rotated with respect to each other until the series of second protrusions are engaged against the series of first protrusions so as to secure the first portion to the second portion.

10. Apparatus according to claim 1, wherein said apparatus is portable.

11. An interchangeable connector arrangement for use in an apparatus, maid apparatus having support means including receiving means and a plurality of continuous elongate members each having a first end adapted to insert and fit into said receiving means of the support means, the connector arrangement including:

a first portion and a second portion, the first portion configured to mate with any one of the plurality of continuous elongate members, and the second portion being one of several distinct interchangeable components;

said first portion having first protrusion means at one end thereof and said second portion having second protrusion means at one end thereof; and wherein said first and second protrusion means are able to releasably engage with one another to provide a secure connection between the first portion and the second portion.

12. A connector arrangement according to claim 11, wherein said first portion and said second portion has at each end thereof any combination of the first protrusion means and the second protrusioa means.

13. A connector arrangement according to claim 11, wherein said first protrusion means includes a series of first protrusions that are formed around a stem extending through a recess, said stem having a bore and said first protrusions in said first protrusion means defining a space between adjacent first protrusions.

14. A connector arrangement according to claim 13, wherein said second protrusion means includes a series of second protrusions that are formed in an interior wall of an opening, each second protrusion being spaced apart from a pillar extending through the opening.

15. A connector arrangement according to claim 14, wherein said pillar is adapted to fit into said bore of said stem and said series of second protrusions initially fits within the respective spaces between the first protrusions, such that the first portion and the second portion are rotated with respect to each other until the series of second protrusions are engaged against the series of first protrusions so as to secure the first portion to the second portion.

16. A connector arrangement according to claim 11, wherein said apparatus is portable.

17. The Apparatus of claim 1, wherein the connector means comprises a first portion fixed to the second end of the corresponding continuous elongate member and a second portion that releasably engages with the first portion and engages a respective article, wherein the second portion is one of several distinct interchangeable second portions, and wherein each second portion is configured to engage a different respective article.

18. The Apparatus of claim 11, wherein each second portion of the several distinct interchangeable second portions is configured to engage a different respective article.

* * * * *